United States Patent [19]

Rigterink

[11] 4,446,818
[45] May 8, 1984

[54] HANGER FOR CONVEYOR TUBES AND THE LIKE

[75] Inventor: Preston D. Rigterink, Milford, Ind.

[73] Assignee: Chore-Time Equipment, Inc., Milford, Ind.

[21] Appl. No.: 383,464

[22] Filed: Jun. 1, 1982

[51] Int. Cl.³ .............................................. A01K 5/00
[52] U.S. Cl. .................. 119/52 AF; 248/323; 248/343
[58] Field of Search .................. 119/52 AF, 52 B, 53, 119/56 R; 248/58, 61, 323, 343

[56] References Cited

U.S. PATENT DOCUMENTS

| | | | |
|---|---|---|---|
| 789,830 | 5/1905 | Zetterlund | 248/61 |
| 3,223,228 | 12/1965 | Ferris et al. | |
| 3,230,933 | 1/1966 | Myers et al. | 119/53 |
| 3,508,302 | 4/1970 | Settanni | 248/343 X |
| 3,511,215 | 5/1970 | Myers | 119/53 |
| 3,598,087 | 8/1971 | Ramser | 119/51.11 |
| 3,757,830 | 9/1973 | Anderson et al. | 138/163 |
| 3,799,116 | 3/1974 | Hostetler | 119/51 R |
| 3,911,868 | 10/1975 | Brembeck | 119/53 |
| 4,003,339 | 1/1977 | Hostetler | 119/52 AF |
| 4,267,800 | 5/1981 | Keller et al. | 119/72.5 |
| 4,317,430 | 3/1982 | Swartzendruber | 119/52 AF |
| 4,351,506 | 9/1982 | Ohai | 248/343 X |

FOREIGN PATENT DOCUMENTS

| | | | |
|---|---|---|---|
| 2133022 | 7/1971 | Fed. Rep. of Germany | 138/163 |
| 935868 | 9/1963 | United Kingdom | 119/53 |

*Primary Examiner*—Robert P. Swiatek
*Attorney, Agent, or Firm*—Trexler, Bushnell & Wolters, Ltd.

[57] ABSTRACT

A hanger for supporting an auger conveyor tube in a given angular position is provided. The hanger comprises a hanger element defining a hole for receiving the conveyor tube, and a number of recesses communicating with the tube hole. Each recess is adapted to mate with a tube flange, so as to locate the tube and a feed drop-out aperture in any of a first series of angularly discrete positions. A series of attachment holes at the hanger element top permit the hanger to be attached to support structure in any one of a second series of angularly discrete positions. In this way, a multiple series of angular positions is provided, so that the conveyor tube may be located in virtually any desired angular orientation.

8 Claims, 10 Drawing Figures

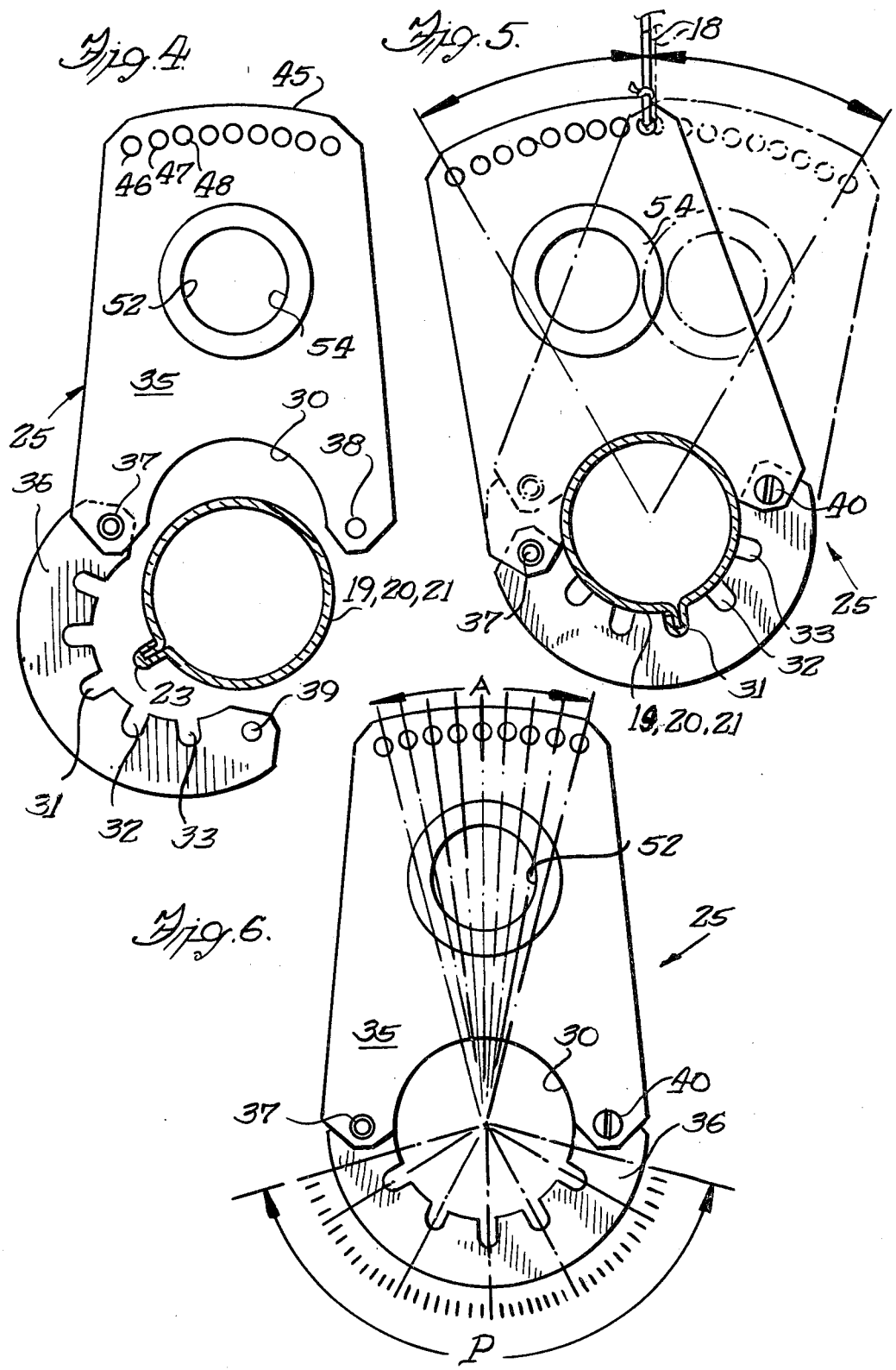

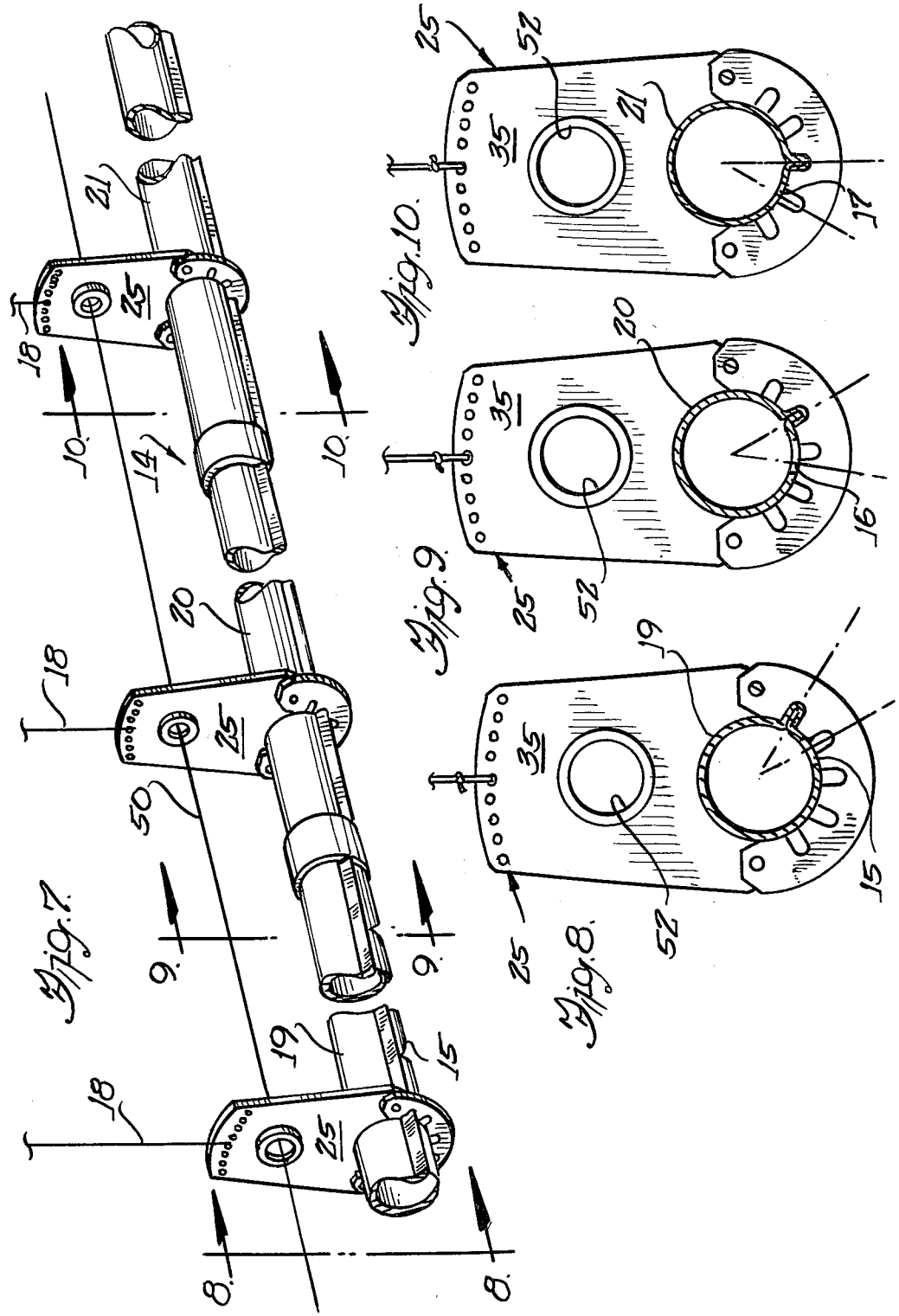

HANGER FOR CONVEYOR TUBES AND THE LIKE

BACKGROUND OF THE INVENTION

This invention relates generally to conveyor systems for poultry feed and like materials, and more particularly concerns a support hanger or support structure for carrying a conveyor tube in a pre-determined location.

Tube conveyors are widely used to transport feed in poultry feeding systems. In many of the commercially successful systems, a helical spring-like auger element is rotated within a conveyor tube to convey granular feed along the tube. One such auger conveyor tube is disclosed in Swartzendruber U.S. Pat. No. 4,317,430. As disclosed there, the auger conveyor tube includes a series of elongated cylindrical tube sections, which can be joined together by bell-and-spigot joints and supported by hangers.

Each tube section is formed by curving or rolling a tube sheet so as to form a radially extending flange-like tube closure seam. Each tube section is also perforated to provide one or more feed drop-out holes or apertures, and these apertures are advantageously located at a given angular displacement or distance from the tube seam. When the feed conveyor tube is installed in a poultry house, many tube sections are fit together to provide a feed conveyor of extended length. Conveyor extents or reaches of several hundred meters or yards in length are not uncommon. Below each drop-out aperture is usually located a feed receiving and delivery device such as a feeder pan. One such pan is shown, for example, in U.S. Pat. No. 3,911,868.

It has been found helpful to assemble the conveyor tube sections so as to array the drop-out holes in helical array of extended pitch. When the holes are so arranged, uniform feed delivery is encouraged, as explained in U.S. Pat. No. 4,003,339.

Of course, the assembled conveyor tube must be supported or hung in the poultry house at a number of locations along the tube length. Preferably, the tube is so supported as to keep it relatively straight and immobile. Moreover, the assembled tube sections must be precisely supported in various angular orientations or amounts of angular displacement, so as to encourage good feed delivery as explained above.

It is accordingly the general object of the present invention to provide an inexpensive yet effective conveyor tube hanger device which will support various tube sections in predetermined angular orientations.

A more specific object is to provide such a conveyor tube hanger device which will permit a conveyor tube section to be located in any one of a great number of angularly discrete positions, in order that the desired helical array of tube section drop-out apertures can be provided.

Another object is to provide such a tube hanger element which can be easily and inexpensively manufactured and installed.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 4 is a front elevational view showing the conveyor tube and associated novel hanger as they may appear during conveyor and hanger installation;

FIG. 5 is a front elevational view similar to FIG. 4 and showing the novel hanger in various angularly displaced positions;

FIG. 6 is a front elevational view similar to FIGS. 4 and 5 and showing, in diagramatic form, a multiple series of hanger and tube location positions;

FIG. 7 is a perspective view showing several of the novel hangers and the assembled conveyor system with the tube sections located in a desired or preferred array;

FIG. 8 is a cross-sectional view taken substantially in the plane of line 8—8 in FIG. 7;

FIG. 9 is a cross-sectional view taken substantially in the plane of line 9—9 in FIG. 7; and FIG. 10 is a cross-sectional view taken substantially in the plane of line 10—10 in FIG. 7.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
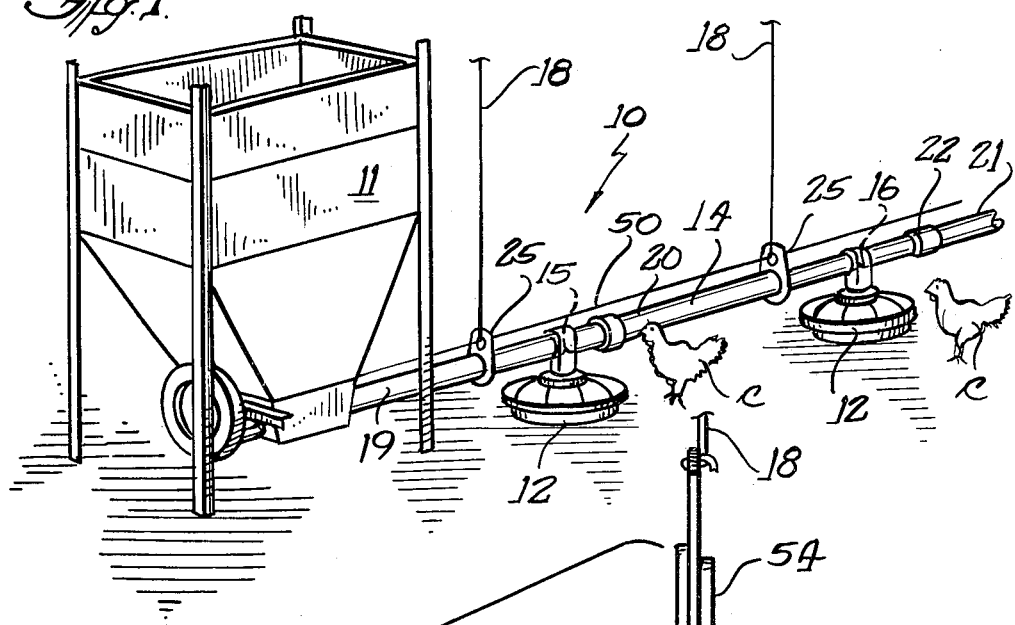
FIG. 1 is a perspective view showing a poultry feed conveyor system utilizing an auger tube which is suspended or supported by the novel tube hanger.
Figure 2:
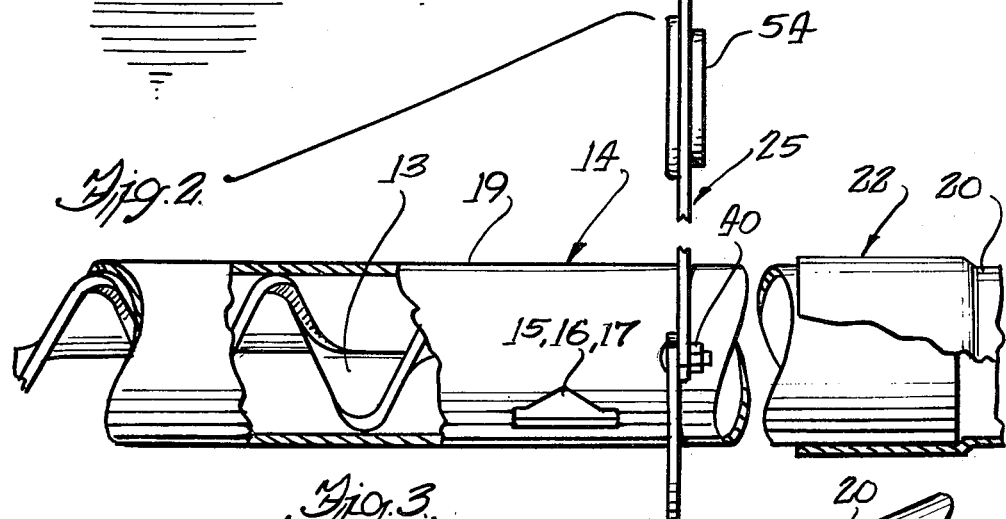
FIG. 2 is a fragmentary elevational view in partial section showing a portion of the auger conveyor and the novel conveyor hanger.

Turning first to FIG. 1, there is shown a conveyor system 10 for conveying feed from a hopper or bin structure 11 to feeder pans 12 for consumption by broiler chickens or other poultry C. In the illustrated embodiment, a centerless helical auger member 13 is disposed within an auger conveyor tube 14, as shown in FIG. 2. When a motor (not shown) rotates the helical auger member 13, feed is moved from the bin 11 along the tube 14 to drop-out apertures 15, 16 and 17 (FIGS. 3 and 8-10) for delivery to the underlying feeders or feed pans 12. Conveyor suspension cables 18 are here secured to a poultry house roof or other support means (not shown).

Figure 3:
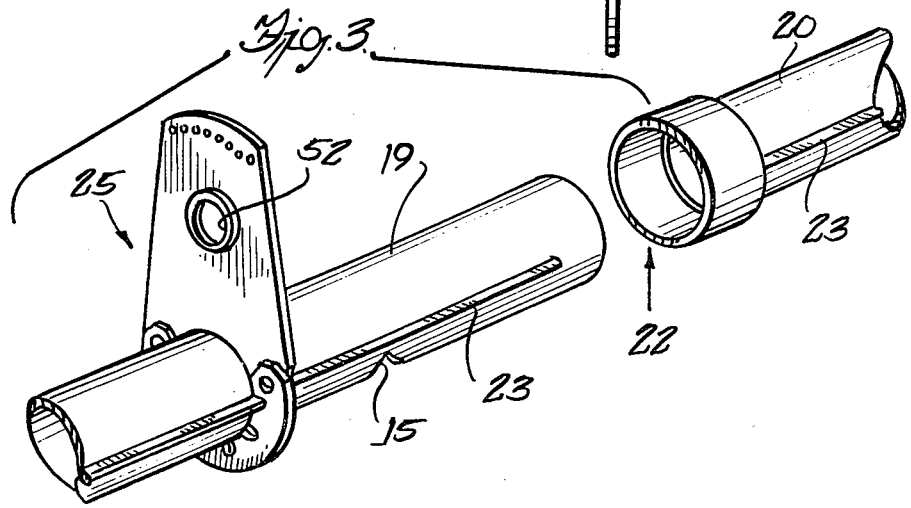
FIG. 3 is a fragmentary exploded view showing the conveyor tube and associated novel hanger.

As illustrated particularly in FIGS. 1-3, the conveyor tube 14 includes in series of tube sections 19, 20 and 21 interconnected by bell-and-spigot joint structure 22. As can be envisioned from FIGS. 3, 4 and 5, these tube sections 19, 20 and 21 are formed by rolling or bending tube sheets into a cylindrical shape. The ends of these tube sheets are formed into a radially extending, tube-closing flange structure 23. One form of such tube flange structure is disclosed and claimed in Swartzendruber U.S. Pat. No. 4,317,430. As can be seen particularly in FIGS. 3 and 7-10, the feed drop-out apertures in each section 19-21 are defined in the formed tube, and each aperture is located at a predetermined angular position relative to the tube section flange 23.

Since all these tube sections 19, 20, 21 are fabricated so as to be substantially identical, it will be understood that the feed drop-out apertures 15-17 can be arranged in a stepped helical array of extended pitch by angularly offsetting each successive tube section 19-21 by given but successive amounts.

In accordance with the invention, this conveyor tube 14 should be supported or suspended in a relatively linear or straight condition for proper operation, and the drop-out holes 15, 16, 17 should be helically arrayed. To this end, the illustrated suspension system includes the novel hanger members 25. The hanger 25 defines a lower hole 30 for receiving the conveyor tube or tube section 19, 20 or 21. A plurality of recesses 31, 32, 33 communicate with this tube hole 30. Each recesses 31-33 is adapted to mate with the tube flange 23, and thus locate the tube 19, 20 or 21 and feed drop-out aperture 15, 16 or 17 in one of a series of discrete angularly offset, distinct, positions.

To permit easy assembly of the hanger 25 over the tube in accordance with one aspect of the invention, the hanger 25 is here made to include a body portion 35 and a cradle portion 36. In the illustrated embodiment, the cradle portion 36 is pivotally connected to the body portion 35 by a rivet 37 or other pivotal connector. Mating holes 38, 39 are formed to receive a bolt or other fastener 40 so as to completely secure the cradle 36 to the body portion 35 when the tube is installed in and on the hanger 25. In carrying out the invention, assembly is made easier by forming all the recesses 31-33 in the cradle portion 36 of the hanger 25.

At or near the top 45 of the hanger 25, a series of attachment holes 46, 47, 48 are formed. In further accordance with the invention, these attachment holes 46-48 permit the hanger 25 to be attached to the support cables or other structure 20 in any one of a second series of angularly offset positions. FIGS. 5 and 6 show that, when the tube 14 is installed in and on the hanger 25, attachment of the cable 18 to the hanger 25 in any one of the selected attachment holes 46-48 will cause the carried conveyor tube section 19-21 to be located in a corresponding angular position.

It will be understood that the first series of flange-receiving slots 31-33 in the bottom of the hanger 25 and the second series of attachment holes 46-48 in the top of the hanger 25 provide a multiple series of angular positions in which the conveyor tubes can be carried. For example, if five recesses are provided, and if nine attachment holes are provided, some forty-five angularly discrete positions of tube carry can be provided. Each position can be slightly angularly offset from the others, as shown in FIG. 6. By providing this great number of angular tube positions, precise angular adjustment of the tube sections and the feed drop-out apertures can be provided.

As shown in FIGS. 1 and 7, an electrified anti-roost wire 50 is customarily installed immediately above the conveyor 14, to prevent poultry from roosting on the conveyor and possibly bending or otherwise damaging the conveyor. To permit this anti-roost wire 50 to pass through the hanger 25 and over the conveyor tube system 14 without electrically contacting the hanger 25, a secondary hole 52 is provided in the hanger body 35 between the tube hole 30 and the adjustment holes 45.

Here, an annular insulator 54 is installed in this secondary hole 52 to insure that the anti-roost wire does not electrically contact the hanger member 25.

The invention is claimed as follows:

1. A hanger for a conveyor tube, the tube comprising at least one tube section having a tube body and a radially extending flange, the tube body defining a feed drop-out aperture located at a predetermined angular position relative to the flange, the hanger defining, at its top, a series of closed attachment holes for permitting the hanger to be attached to support structure in any one of a first series of angularly displaced positions, the hanger defining, at its bottom, a hole for receiving the conveyor tube, and a series of recesses communicating with the tube hole, each recess being adapted to mate with the tube flange for locating the tube and feed drop-out aperture in any one of a second series of angularly displaced positions, the series of holes and the series of flange-receiving recesses together defining a multiple series of angularly discrete positions for the conveyor tube drop-out aperture, the number of angularly discrete positions thus made available substantially equalling the number of recesses multiplied by the number of attachment holes.

2. A hanger according to claim 1 wherein said hanger includes a body portion defining a part of said tube hole, and a cradle portion connected to the body portion and defining another portion of said hole.

3. A hanger according to claim 2 wherein said hanger includes insulator means for permitting and electrified anti-roost wire to be associated with said conveyor tube without electrically contacting the hanger.

4. A hanger according to claim 2 wherein said flange recesses are defined in said cradle portion.

5. A hanger according to claim 2 wherein said cradle portion is pivotally connected to said hanger body portion.

6. A hanger according to claim 1 wherein said hanger defines a secondary hole for permitting an electrified anti-roost wire to pass through the hanger and over the conveyor tube without electrically contacting the hanger.

7. A hanger according to claim 6 including insulator means carried in and on said hanger secondary hole for positively insulating said hanger from said anti-roost wire.

8. A hanger for supporting a conveyor tube in a given angular position, the tube comprising at least one tube section having a tube body and a radially extending flange, the tube body defining a feed drop-out aperture located at a predetermined angular position relative to the tube flange, the hanger comprising a hanger element defining a hole for receiving the conveyor tube, and a series of recesses communicating with and arrayed along the bottom periphery of the tube hole, each recess being adapted to mate with the tube flange so as to locate the tube and feed drop-out aperture in a given angular position, the hanger further defining a series of attachment holes for permitting the hanger to be attached to support structure in any one of a series of angularly discrete positions, so as to locate the carried conveyor tube in any one of a corresponding number of angularly discrete positions.

* * * * *